United States Patent

Shorten

[11] Patent Number: 6,120,874
[45] Date of Patent: Sep. 19, 2000

[54] LIFELINE TAPE

[76] Inventor: Charles Edward Shorten, 40590 Road 74, Dinuba, Calif. 93618

[21] Appl. No.: 09/336,993

[22] Filed: Jun. 21, 1999

[51] Int. Cl.[7] ................................................. B32B 5/08
[52] U.S. Cl. ................................. 428/92; 428/195
[58] Field of Search ........................ 428/195, 88, 92, 428/91

[56] References Cited

U.S. PATENT DOCUMENTS

| | | | |
|---|---|---|---|
| 5,609,933 | 3/1997 | Stepanek | 428/40.1 |
| 5,633,058 | 5/1997 | Hoffer et al. | 428/40.1 |
| 5,683,775 | 11/1997 | Franklin | 428/40.1 |
| 5,693,394 | 12/1997 | Nagai et al. | 428/42.1 |

Primary Examiner—Alexander S. Thomas
Attorney, Agent, or Firm—Patent & Trademark Services; Thomas Zack; Joseph H. McGlynn

[57] ABSTRACT

A tape marking system used to mark the proper direction of escape during an emergency. The tape has extending fibers oriented at about 45 degrees from a supporting backing layer to provide a smooth to the touch feeling surface in one direction and a rough to the touch surface feel in the opposite direction. By associating one of these feel sensitive surfaces with the proper direction to travel in an emergency, usually the smooth surface, the marking tape even if visually not seeable can be used to lead a person by feel to safety. An adhesive backing on the backing layer allows the layer and its fibers to be applied about light switch height along the length of the passageway to be followed to safety. Exposed indicia, like words combined with symbols, in center of the backing surface can be used to visually inform a user of the desired direction to travel beforehand. This tape strip can be used in buildings, airplanes, trains, boats or any other structure having a passageway to an escape exit.

5 Claims, 2 Drawing Sheets

LIFELINE TAPE

BACKGROUND OF THE INVENTION

This invention relates to a surface marking device used to indicate a desired egress route. In situations where a person's vision is impaired, for whatever reason, it may be necessary to very quickly find an exit in an emergency situation. Included in these many situations would be finding one's way to an exit in a smoking passageway during a fire or simply finding one's way at night when little or no light is present. These life threatening situations from smoke inhalation could be in an office building, theater, home, or could be present in vehicles transporting persons, such as in airplanes, ships or trains.

Even if external source factors like smoke, gas are not present to impair a person's vision, it may be that the vision of a specific individual is sufficiently impaired by due to irregularities in their visual system or light conditions to make finding an exit in an emergency situation difficult or impossible in a short time frame. Regardless of the source of limited vision, whether from external or internal sources, finding one's way along a passageway during an emergency may be necessary to avoid very undesirable results.

The present invention is directed to a surface marking system which does not depend on the vision of the user to see the marking system but is based on the feel of the material on the surface designating the proper direction of route of escape all as will be described in detail hereafter.

DESCRIPTION OF THE PRIOR ART

Tape like devices that can be used to mark an existing supporting surface to indicate a route to be followed during an emergency or any other time are known.

For example, in the U.S. Pat. No. 5,609,933 to Stepanck there is disclosed a ceremonial roll of material having a small layer or strip of releasable adhesive on the floor surface of the roll.

U.S. Pat. No. 5,633,058 to Hoffer et al. discloses a message-indicating self-wound tape having an adhesive layer and an opposite surface release layer.

U.S. Pat. No. 5,683,775 to Franklin discloses a pressure sensitive label roll having a carrier web with labels releasably adhered by pressure sensitive adhesive to the carrier web.

U.S. Pat. No. 5,693,394 to Nagai et al. discloses a pressure-activated fluorescent marking tape.

SUMMARY OF THE INVENTION

This invention relates to a tape marking system which is adhesively held to a supporting surface to mark the desired direction of the route of escape determined by feeling the exposed surface of the tape.

It is the primary object of the present invention to provide for an improved tape marking system which is not dependent on viewing the tape but on the feel of the tape's exposed surface.

Another object is to provide for such a marking system wherein the tape feels smooth in one direction and rough in the opposite direction.

These and other objects and advantages of the present invention will become apparent to readers from a consideration of the ensuing description and the accompanying drawings.

DESCRIPTION OF THE PREFERRED EMBODIMENT

Figure 1:
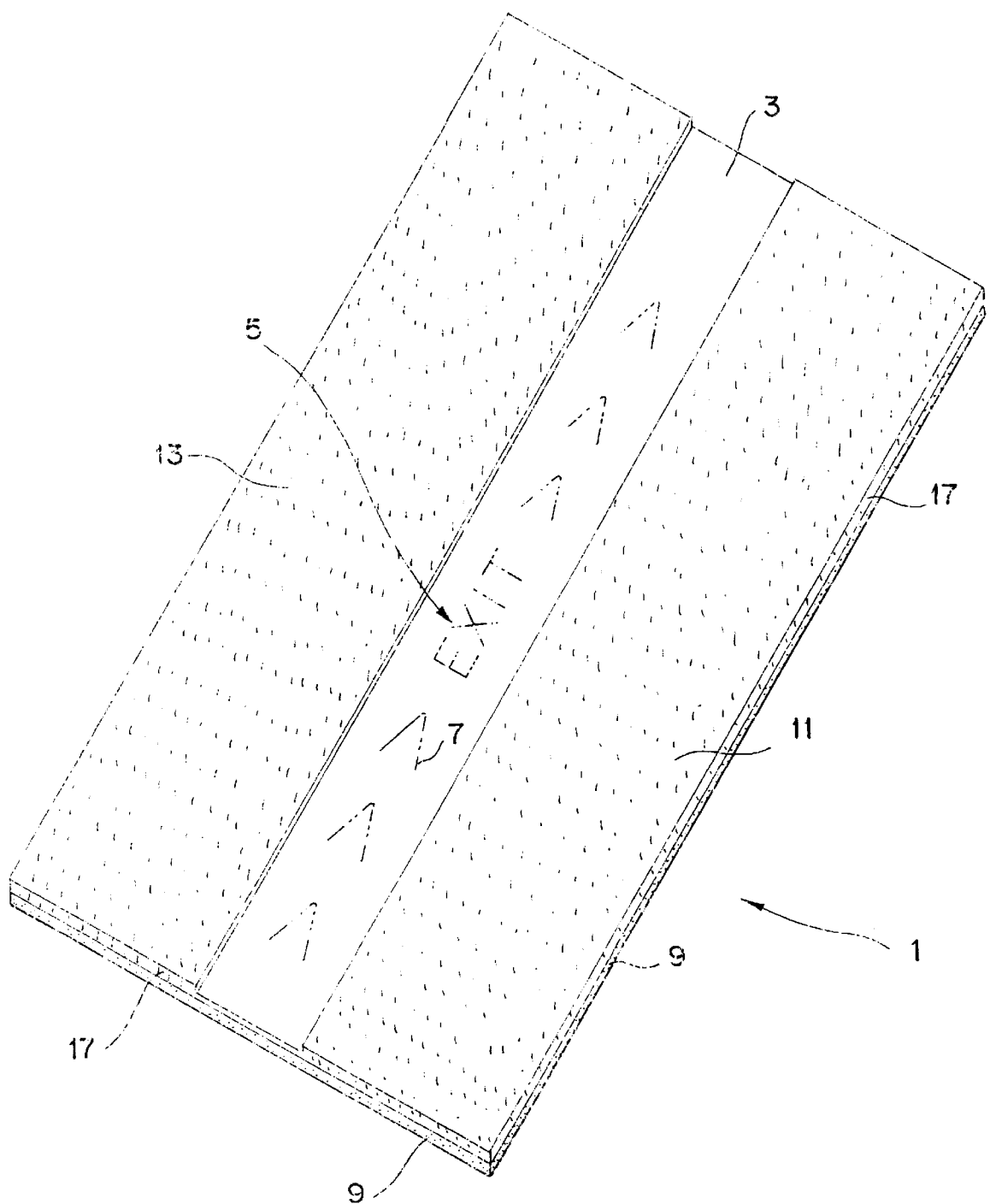
FIG. 1 is a top schematic view showing the present invention.

FIG. 1 is a top schematic view showing the present invention. Normally, the tape 1 constituting the invention is applied along the length of a wall to mark the fire or emergency escape passageway. The tape has a smooth exposed surface center section 3 extending along the tape's length. Indicia 5 consisting of words, like EXIT, by themselves or combined with other symbols is imprinted on the center section and repeated along the tape's length. In this particular embodiment, spaced arrowheads 7 designating the proper direction of escape are combined with the word EXIT. A layer of adhesive material 9 coats the lower exposed surface of the tape along its length and is used to attached the tape to a wall on which mounted.

Sometimes the arrows heads 7 and words in section 3 are not visually obserable, for whatever reason. When this takes place, two identical side flexible strips 11 and 13 extending the length of the tape on both sides of the center section 3 are used to assist the user in feeling the right direction to travel to escape (i.e., the direction the arrows heads 7 point). Like the center section 3, the side tape strips 11 and 13 extend along the length of the tape supported by walls. Normally, the tape strip 1 is adhesive applied to the wall and spaced above the floor a fixed distance (like about 48 inches) so that an upright person's hand whether walking or in a wheel chair could easily touch their exposed surface sections without any undue stretching up or down. The exposed surfaces of the exit marking two side strips 11 and 13 are appreciably different to one's touch depending on the direction one's fingers touches them along the tape's length. Thus, if desired to mark the escape direction as smooth, the exposed tape strips 11 and 13 would each have a smooth feels to one's feel when run along the tape's length in the direction of the arrows heads 7 point. Conversely, an appreciably opposite feel would result if one were to run their fingers or hands along the tape's length in the direction opposite to the arrows head 7. The proper direction to travel to escape in an emergency would as a consequence by dependent on ones sensory sense of feel allowing a person to be informed of the proper travel direction with little or no visual sensory function.

The emergency escape passageway having the tape 1 of FIG. 1 applied along its length could be in an office building, an airline, train, boat, home, or any other structure where it is desired to define an escape route from fire or any natural or man made occurring or possible disaster. Clearly, persons occupying the structure in question would need to be informed of the proper feel sense needed to find the proper direction of travel for the escape route beforehand.

Figure 2:
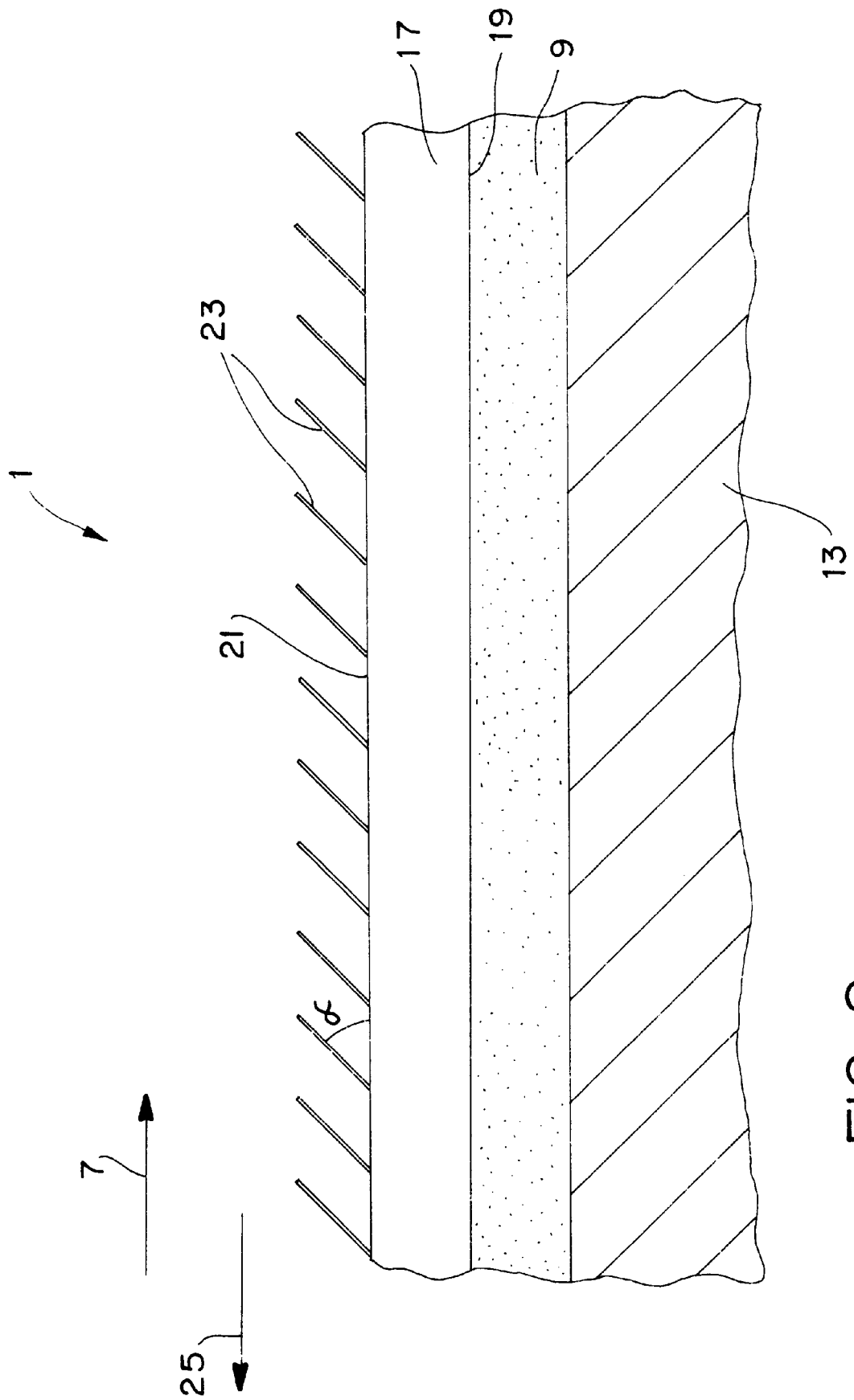
FIG. 2 is an enlarged cross sectional side view of a typical section of the marking tape used in FIG. 1.

FIG. 2 is an enlarged cross sectional side view along the length of a typical section of the marking tape 1 used in FIG. 1. Tape 1 is of the same cross sectional construction. The tape layer 9 that lays flat against the wall includes a thin layer of adhesive material selected to adhere to the supporting wall 15. Facing the adhesive layer 9 is a backing layer surface 17. This backing layer surface has two opposite side surfaces 19 and 21 and forms a backing layer interposed between the continuous adhesive layer 9 on one side and the outer exposed surface layer 23 on its opposite side surface. Supported by backing layer 17 is the outer exposed layer 23. Outer layer 23 consists of individual spaced fibers. All the fibers are about the same length and construction and all are oriented in the same direction at the same angle a relative to their their flat planar lower supporting surface layer 17. By selecting the angle α to be less than 90 degrees, and preferably less than 45 degrees, running ones fingers in the direction of arrow 7 will provide a smooth to the touch feel. Conversely, running ones fingers along the spaced fibers forming layer 23 in the opposite direction 25 will provide a rough to the touch feel surface like going against the grain feel. The individual spaced flexible fibers making up layer 23 need only extend a short distance from the surface 17. The fibers in layer 23 normally extend along most if not all of the total surface length of the tape 1 and are found in the side areas 11 and 13. Layer 17 and the fibers in layer 23 can be made of a variety of different common materials such as nylon, plastic, paper, etc. Additionally, the thin lower adhesive layer 9 need not be continuous layer against the backing surface layer 17 and may only be spaced patches of adhesive material interposed along the length of layer 17 sufficient to adhere the layer to the supporting wall surface.

It is anticipated that the tape 1 would come in flexible rolls of tape and be dispensed from them as needed. Selecting the proper feel and direction of travel is predetermined beforehand and may vary as desired by the user. These tape strips can be installed at light switch height almost anywhere on any convenient surface to mark the proper direction to travel in an emergency. Hallways in buildings, along aisles in airplanes, boats or trains are just some of the many existing supporting surfaces that can be used to adhere the backing tape 1 with the adhesive on layer 9.

The individual fibers making up the top exposed tape layer 23 of the two sections 11 and 13 may have indicia such as words or symbols imprinted between them, as shown FIG. 1, or the indicia may be imprinted into the top exposed surface 21 of supporting layer 17. The words or symbols, or both, 5 are used to visually convey to a user the proper direction of travel or any other relevant information desired. When imprinted into the top surface 21 of layer 17, as in FIG. 1, the words and symbols 7 would not be visible in a side view. The tape strips 1 may be of any convenient width, like 1.5 inches, and may have a layered total thickness of about 0.125 inches (⅛ inch). Such dimensions can be varied to suit the particular manufacturer or user. Additionally, the tapes may have exposed brightly colored or fluorescent surfaces 21 to inform user of their purpose when they are visually observable.

The adhesives used in layer 9 need be strong to prevent the easy removal of the tape strips from their supporting existing supporting surfaces. An additional TEFLON outer backing material (not shown) may be applied over the adhesive layer which is removed immediately before the tape is applied.

When the tape strips are properly applied on a supporting wall surface, the ever apparent dangers from smoke inhalation during a fire are reduced by reducing the exposure time individuals are subjected to any smoke. This life saving device provides for a relatively inexpensive medium that can be easily applied to allow the easy access by feel alone to exits regardless of light conditions or the visual ability of the user.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A tape marking system comprising:
   a tape strip supportable on an existing surface, said tape strip having an exposed first layer and a second flat backing layer,
   said second backing layer having a first exposed side surface and an opposite second side surface,
   said second side surface backing having a third adhesive layer at least partially along the length of the second side surface: and
   said first exposed layer including a plurality of attached individual spaced extending fibers, each of said fibers being oriented at an angle of less than 90 degree in substantially the same angular direction with respect to the second flat backing layer to form a smooth to the touch feeling surface in one direction along the length of the tape and a rough to the touch feeling surface in the opposite direction along the length of the tape.

2. The tape marking system as claimed in claim 1, said third adhesive layer is a substantially continuous layer along the second side surface facing of the second backing layer.

3. The tape marking system as claimed in claim 1, wherein said existing surface for supporting said tape strip is vertically disposed and has a lower vertical end, said tape strip being adhesively bonded on said existing surface at its third adhesive layer about 4 feet from the supporting surface's lower vertical end.

4. The tape marking system as claimed in claim 1, wherein said plurality of individual fibers of said first layer are each of oriented at an angle of about 45 degrees in the same general angular direction with respect to the second flat backing layer.

5. The as claimed in claim 1, wherein said second backing layer has exposed indicia facing in the direction of the first layer to indicate a desired direction of travel along the length of the tape.

* * * * *